United States Patent
Jagadeesan et al.

(10) Patent No.: US 7,251,241 B1
(45) Date of Patent: Jul. 31, 2007

(54) DEVICES, SOFTWARES AND METHODS FOR PREDICTING RECONSTRUCTION OF ENCODED FRAMES AND FOR ADJUSTING PLAYOUT DELAY OF JITTER BUFFER

(75) Inventors: Ramanathan T. Jagadeesan, San Jose, CA (US); Luke Surazski, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1193 days.

(21) Appl. No.: 10/225,814

(22) Filed: Aug. 21, 2002

(51) Int. Cl.
*H04L 12/56* (2006.01)
*H04L 12/00* (2006.01)

(52) U.S. Cl. ............... 370/352; 370/389; 370/465; 709/231

(58) Field of Classification Search ............... None
See application file for complete search history.

(56) References Cited

U.S. PATENT DOCUMENTS

| | | | | |
|---|---|---|---|---|
| 5,253,326 A * | 10/1993 | Yong | ............ | 704/200 |
| 6,499,060 B1 * | 12/2002 | Wang et al. | ............ | 709/231 |
| 7,043,671 B2 * | 5/2006 | Bader et al. | ............ | 714/701 |
| 2003/0058871 A1 * | 3/2003 | Sastry et al. | ............ | 370/401 |
| 2003/0133441 A1 * | 7/2003 | Watanabe et al. | ............ | 370/352 |
| 2006/0146934 A1 * | 7/2006 | Caglar et al. | ............ | 375/240.12 |

\* cited by examiner

*Primary Examiner*—Seema S. Rao
*Assistant Examiner*—Robert C. Scheibel, Jr.
(74) *Attorney, Agent, or Firm*—Marger Johnson & McCollom, P.C.

(57) ABSTRACT

Source devices, softwares and methods are provided for predicting at a transmitting source how well a specific encoded frame, relative to other frames in a stream, would be reconstructed if it were not available for eventual playout at a receiving destination. If poorly, then the specific encoded frame is packetized and transmitted advantageously with respect to other packets in a stream. The transmitted stream will have higher jitter. Predicting is performed at the source by synthesizing a replicated frame, which emulates how the specific frame would be reconstructed at the destination. Then the replicated frame is compared with the decoded specific frame. The eventual playout will have a higher fidelity to the original, since reconstructed from more critical frames. Receiving devices, softwares and methods are provided for receiving in a jitter buffer a stream of packets containing encoded data frames, determining that they have been packetized differently from each other, and setting a playout delay of the jitter buffer responsive to the determination, regardless of high jitter.

43 Claims, 9 Drawing Sheets

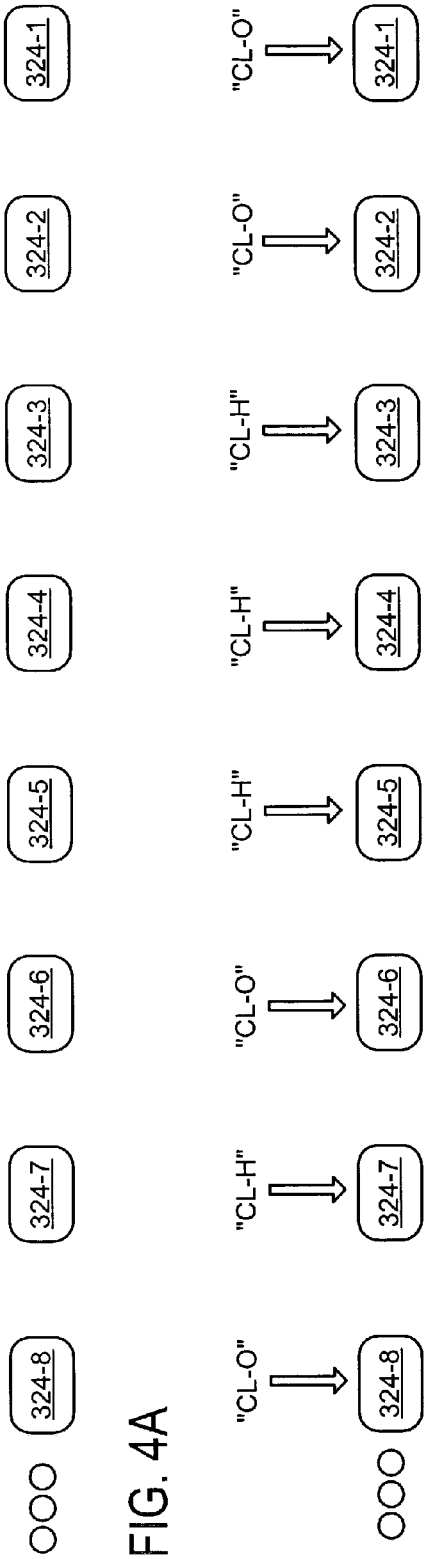
FIG. 4A
FIG. 4B
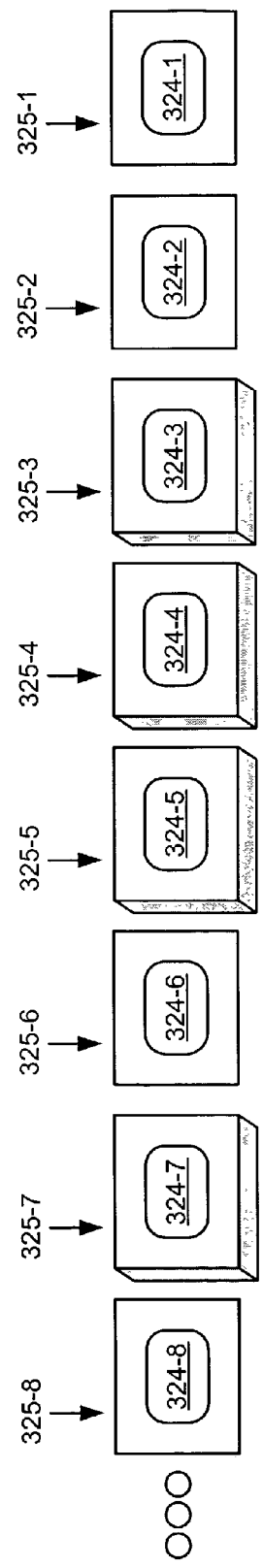
FIG. 4C

DEVICES, SOFTWARES AND METHODS FOR PREDICTING RECONSTRUCTION OF ENCODED FRAMES AND FOR ADJUSTING PLAYOUT DELAY OF JITTER BUFFER

BACKGROUND OF THE INVENTION

1. Field of the Invention

The present invention is related to the field of communications through networks, and more specifically to devices, softwares and methods for predicting at a source how well a specific encoded frame would be reconstructed at a destination, and devices, softwares and methods for adjusting a playout delay of a jitter buffer.

2. Description of the Related Art

Networks, such as the internet, were primarily made for data communication in an asynchronous mode. The data is encapsulated into packets, and each packet is transmitted individually. The packets are received at the destination, and the data is extracted.

Recently networks are being used increasingly for communications. Data is transmitted, received, and played out in real time. For voice communications, for example, a Voice over Internet Protocol (VoIP) is used to transmit real-time voice traffic over an Internet Protocol (IP) network. Other applications are being devised for other types of real time media.

Referring now to FIG. 1, a format for data transmission is described in more detail. The format of FIG. 1 is intended for real time transmission. It will be appreciated that FIG. 1 may apply to any type of such transmission, such as a two-way voice conversation, a one-way broadcast stream such as video or radio, etc.

A network 110 is used to facilitate a transmission from a source device 120 to a destination device 130. Network 110 may be any communications network, such as the internet, a Local Area Network (LAN), a Metropolitan Area Network (MAN), etc.

Source device 120 is also called merely source 120. It establishes a connection 122 with destination device 130. Then source 120 transmits data packets 125 through network 110 towards destination device 130. If the communication is two-way, then packets may be transmitted also in the opposite direction.

Destination device 130 is also called merely destination 130. Destination 130 includes a jitter buffer 132, a decoder 134, a packet loss reconstruction (PLC) module 136 and a playout module 138.

Jitter buffer 132 holds packets 125 as they are received from network 110. Decoder 134 decodes the packets stored in jitter buffer 132. PLC module 136 reconstructs the data of those packets that are not received. Then a stream of data frames (some decoded, some reconstructed) are input in playout module 138. The latter may include a speaker (for voice), a screen (for video or still images), etc.

The requirement of real time transmission has presented problems. The problems arise from the fact that networks were initially designed to be asynchronous. These problems are now described in more detail.

A first problem is that packets 125 are simply lost in network 110. This results in packet loss L1. This is not a problem for most non-real-time applications, which use a reliable transport protocol, because a lost packet will be discovered and retransmitted. But for a real time application, there will be no time for this type of recovery.

A second problem is that packets 125 do arrive at destination 130, but delayed. They may not arrive in time for playout, which is the same as if they had been lost. One possible reason for such a delay is congestion at a specific node of network 110, e.g. at one of its routers (not shown individually). This type of loss is characterized as a packet loss L2. Loss L2 is shown as happening within network 110, even though the actual discarding may take place farther in destination device 130.

A third problem is that sometimes jitter buffer 132 becomes full to capacity. Some of the received packets 125 are discarded to make more room, even though they were not lost and arrived in time. This discarding is equivalent to another source of packet loss L3.

Jitter buffer 132 may be adaptive. It has a playout delay that may be variable, depending on the exhibited jitter of packets 125. The higher jitter is ascribed to network congestion. Upon perceiving high jitter, the playout delay is adjusted to a higher value. This gives a higher opportunity for packets to arrive, thus not miss their deadlines, and thus minimizing losses L2 and L3 of FIG. 1. But lengthening the playout delay presents other problems, by increasing the total end-to-end delay.

Packets from jitter buffer 132 are decoded in decoder 134. Decoder 134 outputs the decoded data to PLC module 136, for use in concealment of subsequent frames.

PLC module 136 then reconstructs the data of those packets that have not been received. In other words, it tries to correct for losses L1, L2, L3. This way the system tolerates losses L1, L2, L3.

A fourth problem is that PLC module 136 does not reconstruct well the data of the missing packets. In other words, the effectiveness of packet loss reconstruction is not uniform for all packets. To the extent that the data of some packets is reconstructed poorly, this is represented as a loss L4, even though it is technically not a data loss, but a loss in Quality of Service (QoS). If in a voice application, loss L4 is that the voice is reconstructed poorly. If in an application that involves transmitting images (e.g. video), then loss L4 is that the images are reconstructed poorly.

Loss L4 may be for a number of reasons. For example, if too many packets are lost in a row (e.g. the losses L1, L2, L3 being "bursty"), then the reconstruction process has less data to work with. In some instances this is more of a problem than others. For example, if the data content repeats over many frames, then it is less critical, and thus less of a problem. But if it contains abrupt changes, then it is more critical. Another one may be the programming of PLC module 136 not being attuned to the nature of the data or the loss. Regardless, loss L4 is compounded to the portion of losses L1, L2, L3 that is not corrected for.

It is desirable to have playout with a high Quality of Service (QoS), even in the face of such losses, and without a long playout delay time.

BRIEF SUMMARY OF THE INVENTION

The present invention overcomes these problems and limitations of the prior art.

Generally, the present invention provides source devices, softwares and methods for predicting at a transmitting source how well a specific encoded frame, relative to other frames in a stream, would be reconstructed if it were not available for eventual playout at a receiving destination. If poorly, then the specific encoded frame is packetized and transmitted advantageously with respect to other packets in a stream.

Predicting may be performed at the source by synthesizing from the specific frame a replicated frame. The replicated frame emulates how the specific frame would be reconstructed at the destination, if not available for playout. Then the replicated frame is compared with the decoded specific frame.

Advantageous packetizing and transmitting may take place in any number of ways according to the invention, or combinations of ways. One such way is to transmit the packetized specific frame redundantly. This will ameliorate the effect of losses in the network.

Another embodiment of the invention is to packetize the specific frame with a higher assigned priority relatively to the other packets. This will make it more likely that the packetized specific frame will arrive at the destination in time for playout without delay. This may be at the expense of other, less critical packets.

One more embodiment of the invention is to packetize the specific frame with a designation of having a lower discardability than the others. Such will make it more likely that the packetized specific frame will not be one of those discarded from a jitter buffer, even in the case where the latter is full.

A further embodiment of the invention is to packetize the specific frame with added redundancy bits. This will result in a more faithful reconstruction at playout.

The invention offers the advantage that the eventual playout will have a higher fidelity to the original. That is because, even though the playout may still include reconstructed frames, a higher proportion of them will be those known in advance to reconstruct well. Those that would not reconstruct well will instead have a higher change of either not being lost or delayed, or not being discarded at the jitter buffer, or being better reconstructed, or any combination thereof.

The present invention further provides receiving devices, softwares and methods for receiving in a jitter buffer a stream of packets containing encoded data frames, determining that they have been packetized differently from each other, and setting a playout delay of the jitter buffer responsive to the determination.

The invention further offers the advantage that the eventual playout will not suffer from long playout delay, when the packetized stream has high jitter due to tiered packetizing and transmitting.

These and other features and advantages of the invention will be better understood from the following Detailed Description and the drawings, in which:

BRIEF DESCRIPTION OF THE DRAWINGS

FIGS. 4A, 4B, 4C show respectively a succession of encoded frames, classification labels assigned by a predictor of the device of FIG. 3 according to an embodiment of the invention, and packets encapsulating the encoded frames, illustrating advantageous packetizing and transmitting for those packets that receive high classification according to an embodiment of the invention.

DETAILED DESCRIPTION OF THE PREFERRED EMBODIMENT(S)

As has been mentioned, the present invention provides source devices, softwares and methods for predicting at a transmitting source how well a specific encoded frame, relative to other frames in a stream, would be reconstructed if it were not available for eventual playout at a receiving destination. If poorly, then the specific encoded frame is packetized and transmitted advantageously with respect to other packets in a stream. The present invention further provides receiving devices, softwares and methods for receiving in a jitter buffer a stream of packets containing encoded data frames, determining that they have been packetized differently from each other, and setting a playout delay of the jitter buffer responsive to the determination. The invention is now described in more detail.

Figure 2:
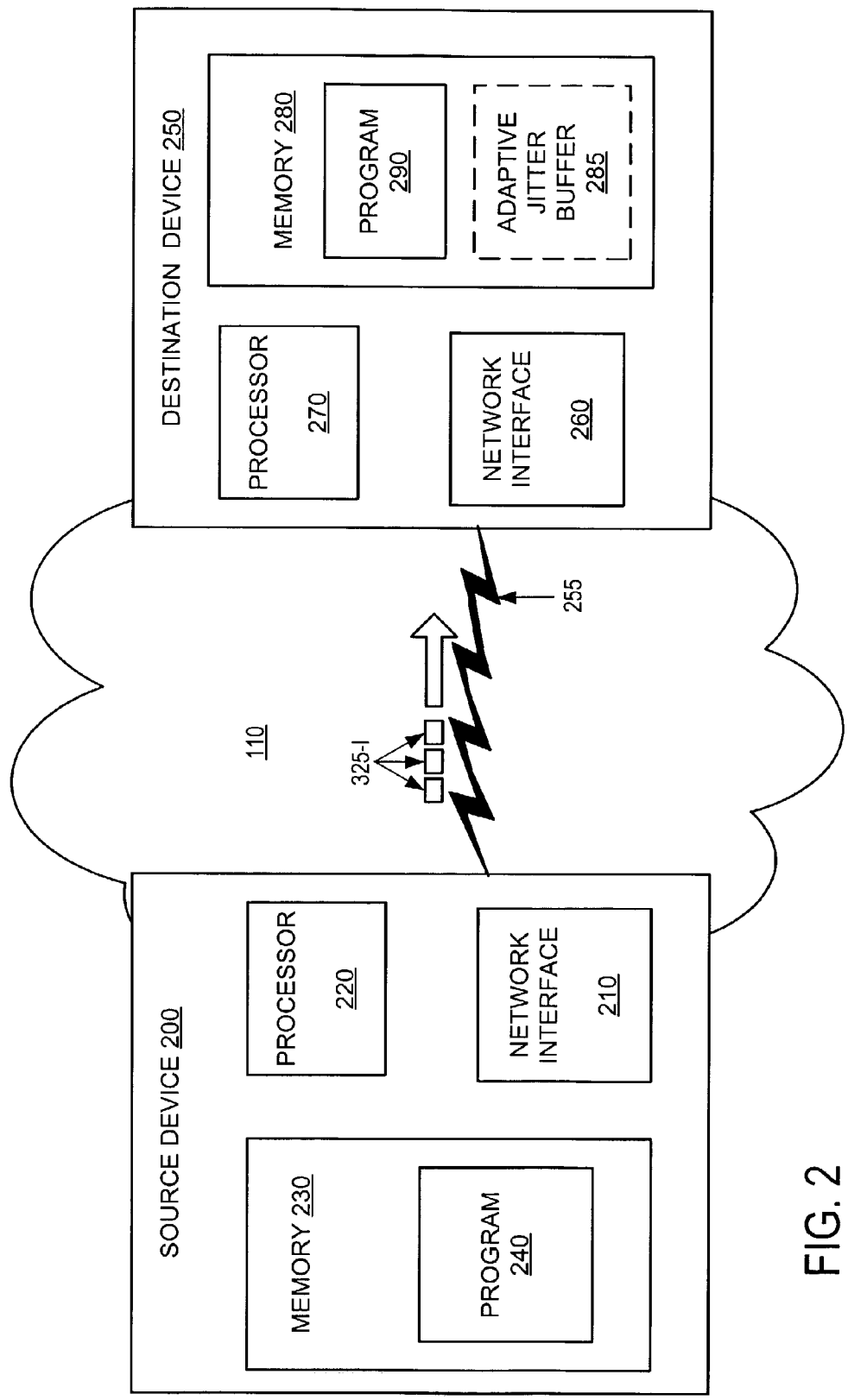
FIG. 2 is a block diagram of a source device and of a receiving device made according to respective embodiments of the invention.

Referring now to FIG. 2, a source device 200 and a receiving device 250 are shown, made according to embodiments of the invention. Devices 200 and 250 may be any type of network device that can accommodate real time media applications that run above the IP layer, such as VoIP.

Figure 1:
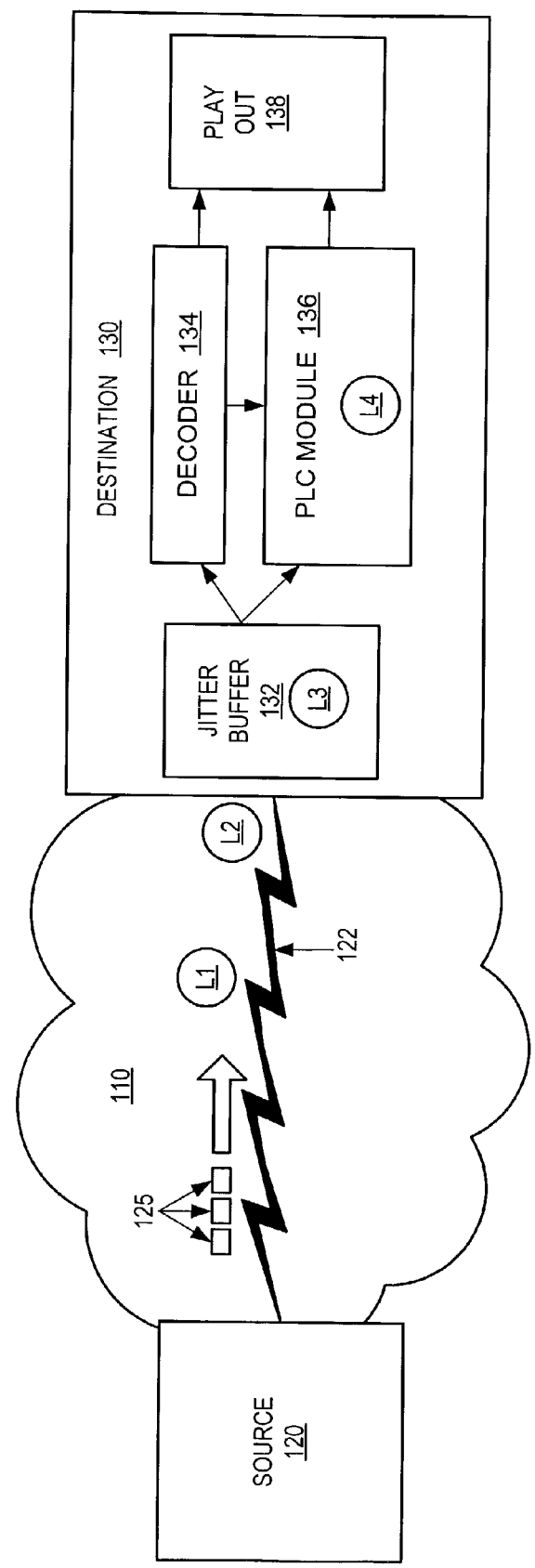
FIG. 1 is a diagram showing a real time transmission in a network, and also where losses occur.

In some instances, source device 200 may make a connection 255 with receiving device 250. This is not necessary, however. A source device 200 may make a different connection with another receiving device, which is not made according to the invention such as device 130 of FIG. 1. In addition, receiving device 250 may make a different connection with another source device, which is not made according to the invention such as device 120 of FIG. 1.

Device 200 is a source device, as it generates and transmits data packets 325. Device 200 may be a voice gateway or an end device, such as an IP telephone, or an IP broadcaster.

Device 200 has a network interface 210 for interfacing with a network, such as network 110.

Device 200 also has a processor 220 coupled with network interface 210. Processor 220 may be implemented as a Central Processing Unit (CPU), or any other equivalent way known in the art. In one embodiment, device 200 additionally includes a memory 230, on which a program 240 may reside. Functions of processor 220 may be controlled by program 240, as will become apparent from the below. Alternately, processor 220 may be implemented as a Digital Signal Processor (DSP), etc.

Device 250 is a receiving device, as it receives data packets 325. Device 250 may be a voice gateway or an end device, such as an IP telephone, or an IP radio.

Device 250 has a network interface 260 for interfacing with a network, such as network 110.

Device 250 also has a processor 270 coupled with network interface 260. Processor 270 may be implemented as a Central Processing Unit (CPU), or any other equivalent way known in the art. Device 250 additionally includes a memory 280. Memory 280 has a portion configured as a jitter buffer 285.

In one embodiment, a program 290 may reside on memory 280. Functions of processor 270 may be controlled by program 290, as will become apparent from the below. Alternately, processor 270 may be implemented as a Digital Signal Processor (DSP), etc.

Figure 3:
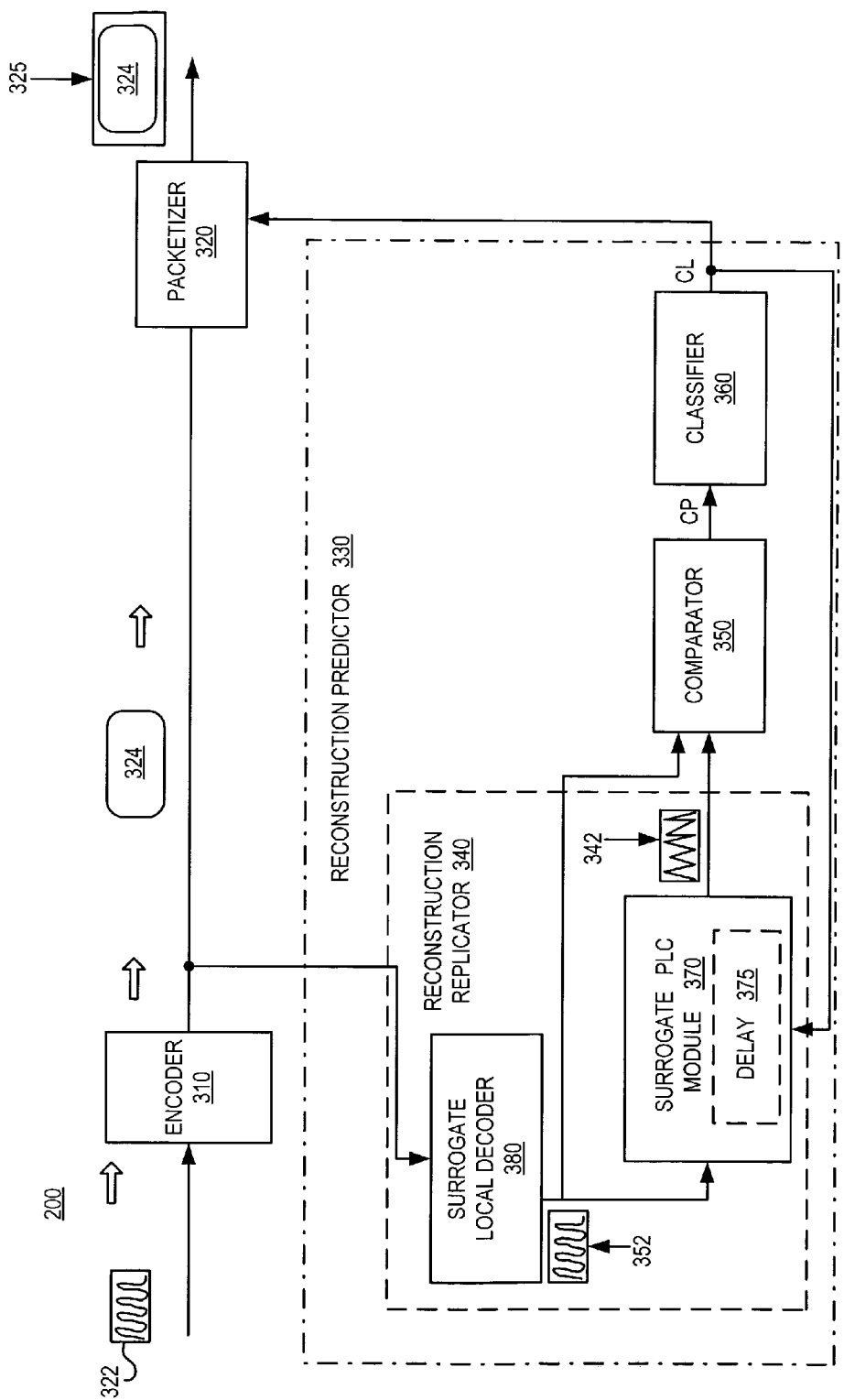
FIG. 3 is a detailed block diagram of the source device of FIG. 2.

Referring now to FIG. 3, a more detailed block diagram of device 200 of FIG. 2 is given, which shows module. It will be appreciated that the detailed block diagram of FIG. 3 may be applied regardless of how device 200 is implemented. For example, in the event of a DSP implementation, the modules may be discrete components. In the event of a software implementation, the modules may be software modules.

Device 200 includes an encoder 310 and a packetizer 320. Encoder 310 receives the input data as a stream of frames. As frame 322 is received, it is encoded by encoder 310, to produce encoded frame 324. Then encoded frame 324 is input in packetizer 320, from where it emerges as a packet 325, suitable for transmission through network 110.

Device 200 further includes a reconstruction predictor 330. Reconstruction predictor 330 predicts how well frame 322 will be reconstructed, and outputs accordingly a classification signal CL. Classification signal CL indicates how critical is encoded frame 324 with respect to other frames in the same stream, for the expected reconstruction process at a receiving device.

Importantly according to the invention, packetizer 320 packetizes encoded frame 324 in accordance with classification signal CL. If classification signal CL indicates that encoded frame 324 is critical, then packetizer 320 packetizes and transmits encoded frame 324 advantageously with respect to other, less critical frames of the same stream.

In the embodiment of FIG. 3, reconstruction predictor 330 includes a reconstruction replicator 340 and a comparator 350. Reconstruction replicator 340 further generates a reconstructed version 342 of frame 322. Comparator 350 compares frame 322 and the reconstructed version 342, and generates an output signal CP. Classification signal CL is derived from output signal CP.

In the embodiment of FIG. 3, reconstruction predictor 330 further includes a classifier 360. Classifier 360 produce classification signal CL from output signal CP.

In the embodiment of FIG. 3, reconstruction replicator 340 includes a surrogate local PLC module 370, to generate the reconstructed version 342 of frame 322. It is local, in the sense that it is at the transmitting device.

Surrogate local PLC module 370 preferably includes a delay 375. In one embodiment, surrogate local PLC module 370 receives classification signal CL.

In one embodiment, surrogate local PLC module 370 receives the same frame 322 as encoder 310. Optionally, so does comparator 350, although that is not necessary for practicing the invention.

In the preferred embodiment, reconstruction replicator 340 additionally includes a surrogate local decoder 380. Surrogate local decoder 380 decodes the encoded frame 324, to reproduce decoded frame 352. In the preferred embodiment, the surrogate local PLC module 370 receives decoded frame 352 instead of frame 322. Optionally, so does comparator 350, although that is not necessary for practicing the invention.

In an embodiment of the invention, a two-way communication device is provided with an encoder—decoder set, which is also known as a codec. Some codecs are further provided with a PLC scheme built in, such as the series G.729 codecs. Other codecs have optional PLC schemes standardized, such as the series G.711 codecs.

The invention may be well practiced by configuring the decoder and PLC scheme that is already provided in a codec to derive reconstruction replicator 340. In other words, the decoder of a codec may be used as surrogate local decoder 380, and the PLC scheme of a codec may be used as surrogate PLC module 370.

Referring now also to FIG. 4A, FIG. 4B and FIG. 4C, the operation of device 200 is described.

FIG. 4A shows a stream of encoded frames 324-i which are to be transmitted in real time. Here, the letter "i" is an index, taking values such as 1, 2, . . . , 8 for each one of the shown encoded frames. This is only a segment of the stream.

Each encoded frame 324-i is output from encoder 310. For each one, the same discussion applies as in encoded frame 324 of FIG. 3.

FIG. 4B shows the same stream of encoded frames 324-i, along with classification labels assigned by reconstruction predictor 330. These labels are encoded in classification signal CL.

Any number of classification label systems may be designated. The shown system uses only two types of labels so as not to confuse the present description.

In the shown embodiment, label "CL-O" stands for "Classification Ordinary", and is the one assigned to encoded frames 324-1, 324-2, 324-6 and 324-8. This means that no special measures would be taken in packetizing and transmitting encoded frames 324-1, 324-2, 324-6 and 324-8.

Additionally, label "CL-H" stands for "Classification High", and is the one assigned to encoded frames 324-3, 324-4, 324-5 and 324-7. This means that encoded frames 324-3, 324-4, 324-5 and 324-7 are packetized and transmitted advantageously with respect to those with ordinary classification.

Another system might use three labels. Where the predictor predicts good reconstruction, it might assign a "low" grade for how critical the encoded frame is, where it predicts ordinary reconstruction an "average" grade, and where it predicts poor reconstruction a "high" grade.

FIG. 4C shows packets 325-i, i=1-8, encapsulating respectively encoded frames 324-i. It will be observed that those encoded frames that received a higher classification are packetized differently than the others of the same stream.

When some packets are packetized and transmitted differently than others, then different classes of packets are generated. These classes may be advantageously designated to correspond to the classification labels (those favored and those not). In the embodiment of FIGS. 4A, 4B and 4C, there are only two classifications, and only two classes of packets. Where three labels are used, three classes of packets may result.

There are a number of ways for advantageously packetizing and transmitting according to the invention. Some of these are explored below, as individual features of the invention in FIGS. 5A, 5B, 5C, and 5D.

As these features are individually described below, it should be borne in mind that any combination of such features may be practiced according to the invention. In fact, when the different classification labels generate different classes, the differentiation in classes may be implemented by combining different ones of the individual features described below in FIGS. 5A, 5B, 5C, and 5D. The more critical an encoded frame is for reconstruction, the more of these features may be combined.

Figure 5A:
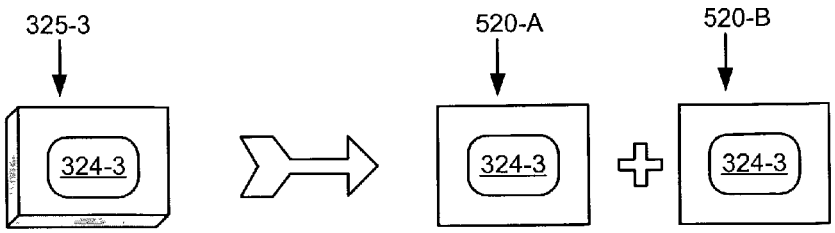
FIGS. 5A, 5B, 5C, 5D shows in more detail how the encoded frames with the high classification of FIG. 4B receive the advantageous packetizing and transmitting generally suggested at FIG. 4C according to various embodiments of the invention.

Referring now to FIG. 5A, according to one embodiment, encoded frame 324-3 is packetized and transmitted redundantly. Redundant packetizing and transmitting may be performed in any number of ways, as is known in the art.

In one embodiment, redundant packetizing and transmitting is performed by having two packets 520-A, 520-B be eventually transmitted from device 200. Each one of packets 520-A, 520-B encapsulates encoded frame 324-3. This ameliorates for losses in the network, designated as losses L1 in FIG. 1. In another embodiment, only portions of encoded frame 324-3 are transmitted in packet 520-B, and so on. And in all such embodiments, packet 520-B may or may not contain another encoded frame.

Figure 5B:
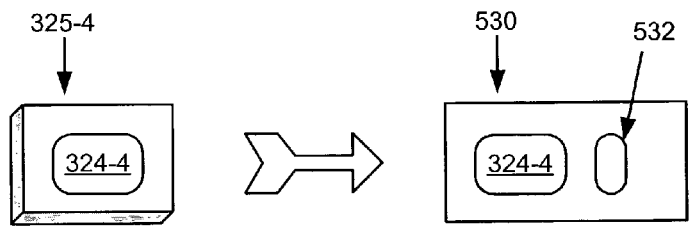

Referring now to FIG. 5B, according to another embodiment, encoded frame 324-4 is packetized and transmitted in a packet 530 with a higher assigned priority relative to a priority of the encoded frames with the ordinary classification. This is designated by a priority bit 532 in packet 530 set to high. In contrast, the priority bits of the packets in the stream with the ordinary classification are set at low. This makes it more likely that packet 530 will be forwarded advantageously within network 110 of FIG. 1. This will ameliorate losses due to delays, designated as losses L2 in FIG. 1.

According to other embodiments, other bits may be set, in a diagram that would look similar to FIG. 5B. These bits may be the precedence bits in Type of Service (TOS), or the DSCP bits in DiffServ.

Figure 5C:
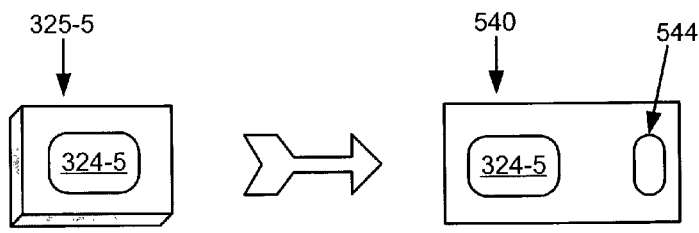

Referring now to FIG. 5C, according to yet another embodiment, encoded frame 324-5 is packetized and transmitted in a packet 540. Packet 540 has a lower assigned discardability relative to a discardability of the encoded frames with the ordinary classification. This is designated by a discardability bit 544 in packet 540 set to low discardability. In contrast, the discardability bits of the packets in the stream with the ordinary classification are set at high discardability. This makes it more likely that packet 540 will not be discarded from jitter buffer 132 of FIG. 1. This will ameliorate losses due to discards, designated as losses L3 in FIG. 1.

Figure 5D:
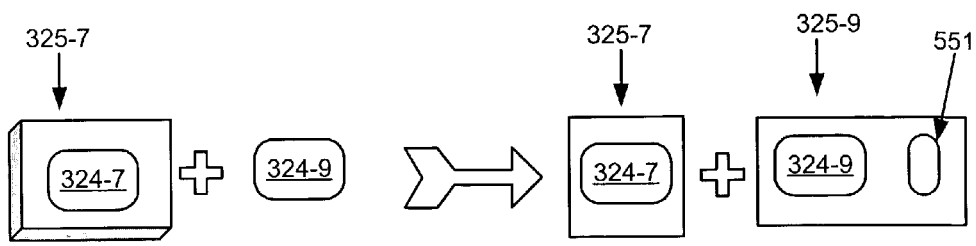

Referring now to FIG. 5D, according to one more embodiment, encoded frame 324-7 is packetized and transmitted with forward error correction (FEC). In other words, encoded frame 324-7 is packetized in ordinary packet 325-7. In addition, FEC bits 551 are transmitted in another packet 325-9. This makes it more likely that packet 325-7 will be reconstructed faithfully at a PLC module of a receiving device, such as PLC module 136 of FIG. 1. This will ameliorate loss of Quality of Service (QoS), designated as loss L4 in FIG. 1.

Packet 325-9 may carry no other information, or may encapsulate an encoded frame 324-9. That may be the case, even if encoded frame 324-9 may have received an ordinary classification. It will be recognized that the embodiment of FIG. 5D is an extension of the redundancy of FIG. 5A.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer. Alternately, the device may be implemented an Application Specific Integrated Circuit (ASIC), etc.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention require physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine.

Various portions, modules or features of it may reside in separate memories, or even separate machines. The separate machines may be connected directly, or through a network, such as a local access network (LAN), or a global network, such as the Internet.

It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed in a control plane, which accordingly may update the local routing table, in addition to neighboring ones. A person skilled in the art will discern which step is best performed in which plane.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

A general method according to the invention includes predicting at a transmitting source whether a specific encoded frame would be reconstructed worse than another encoded frame in a stream, if not available for playout at a receiving destination. The encoded frame would be not available for playout if it were lost, as per the above.

The prediction may be with respect to one other encoded frame, such as a reference frame. Or it may be with respect to one or more groups of them.

If so, then the specific frame is packetized and transmitted advantageously with respect to the other frame. This takes place as described above, also with respect to FIGS. 5A, 5B, 5C and 5D.

In one embodiment, predicting includes synthesizing a replicated frame at the source. The replicated frame emulates how the specific frame would be reconstructed at the destination, if it were not available for playout. Then the replicated frame is compared with the specific frame. Packetizing and transmitting the specific frame is controlled according to a result of comparing.

Figure 6:
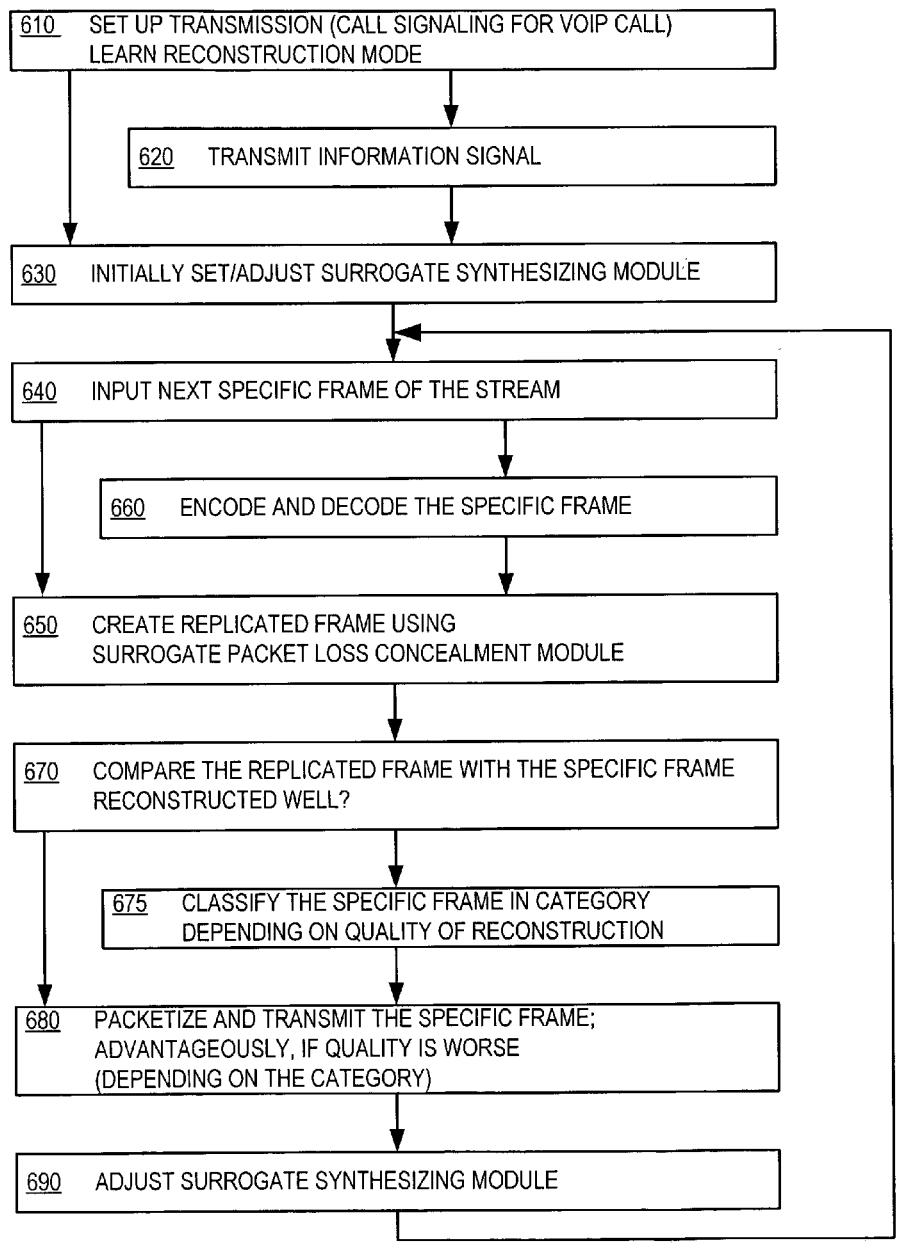
FIG. 6 is a flowchart illustrating a method according to an embodiment of the present invention.

Referring now to FIG. 6, a flowchart 600 is used to illustrate a more detailed method according to an embodiment of the invention. The method of flowchart 600 may also be practiced by device 200 of FIG. 2 and FIG. 3. It will be appreciated that flowchart 600 may also be used to illustrate the general method of the invention described above, by combining some of the boxes.

According to a box 610, a transmission is set up. In the case of a VoIP call, this takes place with call signaling, during call setup.

A reconstruction mode of a receiving device is then learned. In other words, what is learned is a mode of how the destination reconstructs frames that are not available for playout. This learning preferably takes place during the call signaling of box 610.

Learning may be by looking up the type of codec of the destination, if its PLC scheme is standardized. Or by express signaling between devices, exchanging their PLC capability.

According to an optional next box 620 an information signal is transmitted to a receiving device. The information signal is to the effect that some frames within the stream are packetized and transmitted differently than others. Optionally and preferably, the information signal is transmitted during call setup.

According to an optional next box 630, a surrogate synthesizing module is initially set or adjusted. This is a local module, which is intended to emulate the action of a similar module in the destination. For example, it may be surrogate PLC module 370. This initial setting or adjusting may be performed in accordance with the mode learned in box 620.

According to a next box 640, a next specific frame of the stream is input. It is designated "the specific" frame, to differentiate it from other frames in the stream.

According to a next box 650, a replicated frame is created using a surrogate packet loss concealment (PLC) module.

According to an optional box 660, between boxes 640 and 650, the specific frame is first encoded, and then decoded. Encoding may be by passing the specific frame through an encoder, such as the regular encoder prior to packetizing. Decoding may be by passing the encoded specific frame through a decoder, such as a surrogate decoder.

According to a next box 670, the replicated frame is compared with the specific frame. That is to determine how well it was reconstructed. This may be performed by inputting them in a comparator. The comparison may include perceptual weighting, similar to that used in analysis-by synthesis voice encoders.

According to an optional next box 675, the specific frame is classified in a category, and given a label, as per the above. The classification is made depending on the quality of reconstruction, as judged from the comparing box 670 above.

According to a next box 680, the specific frame is packetized and transmitted. If, at box 670, the comparison predicted that reconstruction would be worse, then packetizing and transmitting is performed advantageously, with respect to at least one other packet in the stream. This is performed as described above with reference to one or more of FIG. 5A, FIG. 5B, FIG. 5C, FIG. 5D. If the specific frame has been classified in a category at box 675 above, then packetizing and transmitting is performed depending on the category, as per the above.

According to an optional next box 690, the surrogate synthesizing module is further adjusted. If, from the comparison, it is determined that the specific packet is likely to be dropped, then adjusting is performed in accordance with the determination. This feedback helps the prediction process for subsequent packets. In one embodiment, the surrogate synthesizing module may consider all packets that have low importance for QoS as dropped, for the synthesis of subsequent frames. This would automatically prevent error propagation due to classification and low QOS, by preventing a long sequence of low-importance class packets.

Returning to FIG. 4C, since some packets 325-3, 325-4, 325-5, 325-7 will be packetized and transmitted differently than other packets 325-1, 325-2, 325-6, 325-8, the resulting stream may have a higher jitter.

The invention discerns that, when the higher jitter is due to non-uniform packetizing and transmitting (such as the present invention), such an increase in the playout delay is unnecessary. That is because, even if the delay is low, the packets that would be discarded would be reproduced well by a packet loss reconstruction module of the receiving device.

Figure 7:
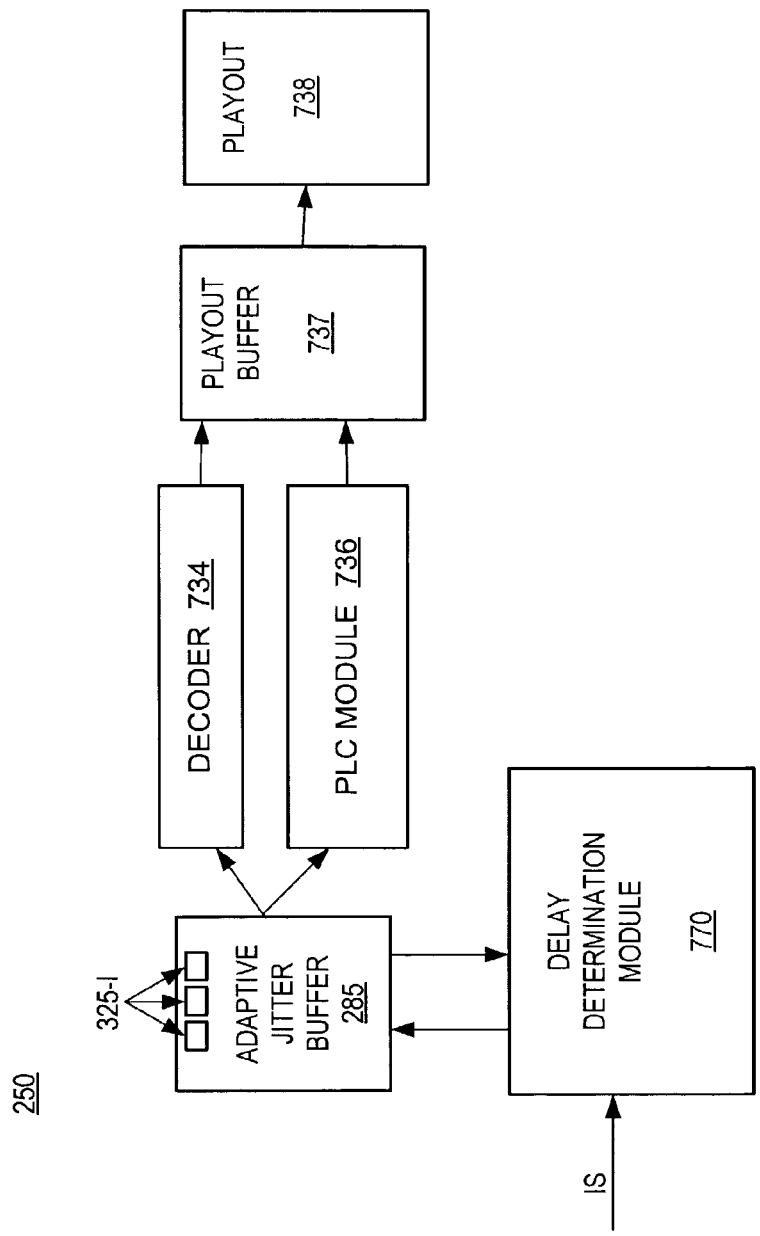
FIG. 7 is a detailed block diagram of components of the receiving device of FIG. 2.

Referring to FIG. 7, a block diagram of receiving device 250 is shown in more detail. Receiving device 250 is also known as destination device 250.

Destination device 250 includes an adaptive jitter buffer 285, a decoder 734, a packet loss reconstruction (PLC) module 736, a playout buffer 737, a playout module 738, and a delay determination module 770. Determination module 770 may be implemented as part of software, DSP, etc.

Jitter buffer 285 receives and stores packets 325 as they are received from network 110. Decoder 734 decodes data frames out of packets 325. PLC module 736 reconstructs the data of those packets that are not received. Then data frames (some decoded, some reconstructed) are input in playout buffer 737, and from there to playout module 738. The latter may include a speaker (for voice), a screen (for video or still images), etc.

Jitter buffer 285 is adaptive. It has a playout delay that is variable, depending on the exhibited jitter of packets 325. Ordinarily, upon perceiving high jitter, the playout delay is adjusted to a higher value. The higher jitter is ordinarily ascribed to network congestion.

Importantly, determination module 770 determines whether the packets in the stream have been packetized and transmitted differentially from each other. In that case, the jitter is ascribed to the differential packetizing and transmitting. Then determination module 770 adjusts the playout delay, overriding the other adjustment if need be.

Adjustment is to a lower value, even in the face of higher jitter for non-critical packets. This exploits the fact that reconstruction will be good, since it will be performed from the critical packets. The adjustment to a lower value will result in discarding more packets. This is done with the confidence, however, that the discarded packets will be the least critical ones for the reconstruction.

In one embodiment, determination module 770 is adapted to receive an information signal IS, such as the information signal transmitted at box 620 of FIG. 6. In that case, determining takes place responsive to the information signal.

In another embodiment, determination module 770 is adapted to analyze and compare priority bits of the stored packets. Then determining takes place responsive to the analysis and comparison.

In one more embodiment, determination module 770 is adapted to analyze and compare discardability bits of the stored packets. Then determining takes place responsive to the analysis and comparison.

In yet another embodiment, determination module 770 is adapted to analyze and compare the decoded data frames for differential redundancy patterns. Then determining takes place responsive to the analysis and comparison.

Figure 8:
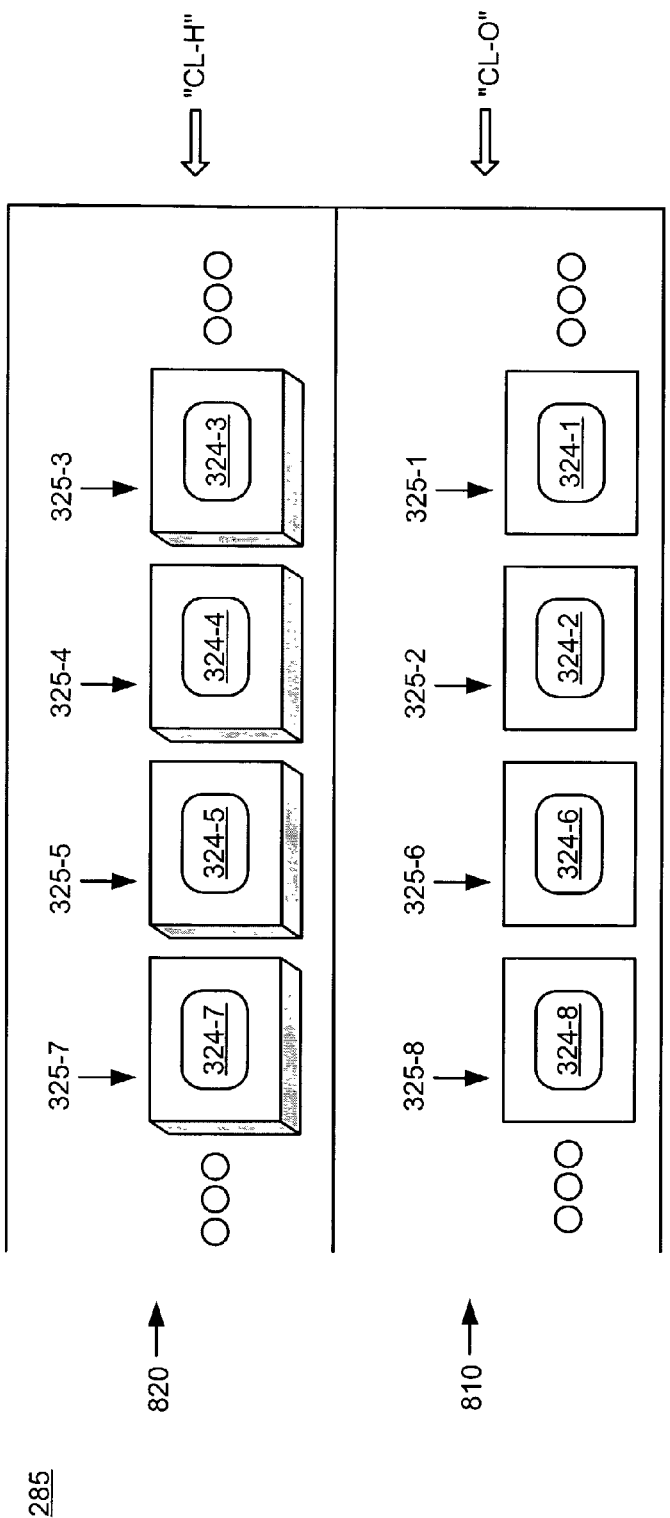
FIG. 8 shows a possible arrangement of a jitter buffer of the device of FIG. 7.

Referring now to FIG. 8, a possible arrangement of jitter buffer 285 is shown. A number of queues are defined, depending on the system of classifications.

To maintain consistency with prior embodiments, in this description two queues 810, 820 are defined in jitter buffer 285. Received packets 325-1, 325-2, 325-6, 325-8 are placed in first queue 810, and received packets 325-3, 325-4, 325-5, 325-7 are placed in second queue 820. In other words, the packets that received an ordinary classification "CL-O" at FIG. 4B are placed in first queue 810, while the packets that received a high classification "CL-H" at FIG. 4B are placed in second queue 820.

A further option according to the invention is that more packets are preferentially discarded from the first queue 810 than from the second queue 820. This permits shortening the playout delay time, which improves substantially the Quality of Service (QoS). Further, the preferentially discarded packets of queue 810 will be reconstructed better, since they are least critical for reconstruction.

Figure 9:
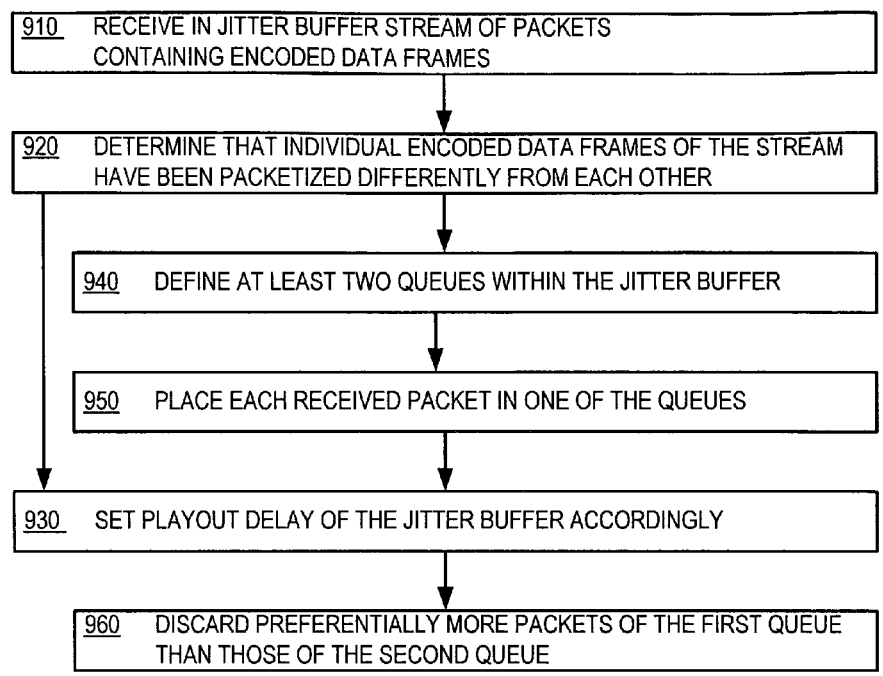
FIG. 9 is a flowchart illustrating a method according to another embodiment of the present invention.

Referring now to FIG. 9, a flowchart 900 is used to illustrate a method according to another embodiment of the invention. The method of flowchart 900 may also be practiced by device 250.

According to a box 910, a stream of packets is received and stored in a jitter buffer. The packets contain encoded data frames.

According to a next box 920, it is determined that individual encoded data frames of the stream have been packetized and transmitted differently from each other.

Determining may be performed in any number of ways. One such way is by receiving an information signal, which may further optionally be received during call setup.

Another such way is by analyzing and comparing. That may be the priority bits of the received packets, their discardability bits, or redundancy patterns in the encoded data frames.

According to a next box 930, a playout delay of the jitter buffer is set accordingly. In other words, it is inferred that the high jitter in the received packets is due to non-uniform packetizing and transmitting, and therefore the playout delay may set low.

According to an optional next box 940 between boxes 920 and 930, at least two separate queues are defined within the jitter buffer. Then according to a next box 950, the received packets are placed in one of the queues.

According to an optional next box 960, if separate queues have been defined within the jitter buffer, preferentially more packets are discarded from the first queue than from the second queue.

The present invention has been described in terms of transmitting voice over a network. That is clearly an example, and not a limitation of the present invention. This document is intended to apply equally well to other types of real time streaming media (such as video), and their combinations.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. An apparatus comprising:
  one or more processors; and
  a memory coupled to the processors comprising instructions executable by the processors, the processors operable when executing the instructions to:
    receive frames to be transferred to a remote endpoint;

exchange signaling with the remote endpoint to identify a reconstruction mode used by the remote endpoint, the reconstruction mode specifying an algorithm used by the remote endpoint to reconstruct lost packets or other information that is not available for playout;

synthesize frames corresponding to the received frames using the identified reconstruction mode to locally simulate one or more potential loss concealment attempts by the remote endpoint;

compare the received frames to the synthesized frames to identify at least first and second groups of the received frames, the first group of the received frames being more completely replicated by the synthesized frames than the second group of the received frames; and transmitting a representation of the second group advantageously with respect to a representation of the first group by transmitting more redundancy bits for the frames in the second group than the frames in the first group.

2. The apparatus of claim 1 wherein the processors are further operable to classify the frames in the second group with a different discardability than the frames in the first group.

3. The apparatus of claim 2 wherein the processors are further operable to mark the representation of the first group with a different discardability classification than the representation of the second group prior to transmission.

4. The apparatus of claim 2 wherein the reconstruction mode is a Packet Loss Concealment (PLC) algorithm.

5. An apparatus comprising:
one or more processors; and
a memory coupled to the processors comprising instructions executable by the processors, the processors operable when executing the instructions to:
receive frames to be transferred to a remote endpoint;
exchange signaling with the remote endpoint to identify a packet loss concealment algorithm used by the remote endpoint to conceal packet loss by synthesizing replacement packets for lost packets using information included in received packets;
synthesize replicated frames locally at the apparatus using the identified packet loss concealment algorithm, the replicated frames corresponding to the received frames and emulating one or more potential loss concealment attempts by the remote endpoint; and
compare the replicated frames to the received frames for identifying at least first and second groups of the received frames, the first group of the received frames having a different loss concealability using the identified packet loss concealment algorithm than the second group of the received frames;
format the first group of the received frames with a different discardability indication than the second group of the received frames; and
transmit a representation of the formatted frames to the remote endpoint.

6. The apparatus of claim 5 wherein the processors are further operable to:
synthesize replicated frames locally at the apparatus, the replicated frames emulating loss concealment by the remote endpoint; and
compare the replicated frames to the received frames to identify the first and second groups.

7. The apparatus of claim 5 wherein the processors are further operable to:
classify the first group of frames in one of a plurality of categories according to the comparison, and
in which formatting is performed according to a result of classifying.

8. The apparatus of claim 5 wherein the processors are further operable to:
encode and then decode the first group of frames prior to the comparison.

9. The apparatus of claim 5 wherein the processors are further operable to synthesize by using a surrogate packet loss concealment module.

10. The apparatus of claim 9 wherein the processors are further operable to:
encode and then decode the first group of frames prior to using the surrogate packet loss concealment module.

11. The apparatus of claim 9 wherein the processors are further operable to adjust the surrogate packet loss concealment module.

12. The apparatus of claim 11 wherein the processors are further operable to:
determine whether a local packet is likely to be dropped based on the comparison, and
in which adjusting is performed in accordance with the determination.

13. The apparatus of claim 11:
in which adjusting is performed initially based on the identified packet loss concealment algorithm.

14. The apparatus of claim 13, in which the packet loss concealment algorithm is identified during call setup.

15. A system comprising:
means for establishing a call extending from a transmitting endpoint to a destination endpoint, the call for transferring a stream of frames from the transmitting endpoint to the destination endpoint;
means for identifying a mode of packet loss concealment used on the destination endpoint;
means for generating at the transmitting endpoint predictive frame data using the identified mode of packet loss concealment used by the destination endpoint, the predictive frame data corresponding to the received stream of frames and simulating concealment frame data to be potentially generated by the remote endpoint in response to packet loss;
means for comparing at the transmitting endpoint the predictive frame data to the stream of frames for identifying at least one of the frames that can be less completely reconstructed using only information included in other frames in the stream than at least one other more reconstructable frame in the stream; and
means for transmitting to the destination endpoint a representation of the identified frames differently than a representation of the more reconstructable frame.

16. The system of claim 15 further comprising means for transmitting a duplicate of the identified frame to the destination endpoint without transmitting a duplicate of the more reconstructable frame.

17. The system of claim 15 further comprising means for transmitting a first amount of redundancy bits for the identified frame and a second smaller amount of redundancy bits for the more reconstructable frame.

18. The system of claim 15 wherein the destination endpoint further comprises:
means for receiving the representation of the stream of frames;

means for determining whether communication segments in the received representation have been transmitted differently from each other; and means for adjusting playout delay according to the determination.

19. The system of claim 15, further comprising:

means for classifying the identified frame in one of a plurality of categories according to the comparison, and in which transmitting is performed according to a result of classifying.

20. The system of claim 15, further comprising:

means for encoding and then decoding the identified frame prior to the comparison.

21. The system of claim 15, in which the means for synthesizing includes surrogate packet loss concealment module means.

22. The system of claim 21, further comprising:

means for encoding and then decoding the identified frame prior to using the surrogate packet loss concealment module.

23. The system of claim 21, further comprising:

means for adjusting the surrogate packet loss concealment module.

24. The system of claim 23, further comprising:

means for determining whether a packet is likely to be dropped based on the comparison, and in which adjusting is performed in accordance with the determination.

25. An apparatus comprising:

one or more processors; and a memory coupled to the processors comprising instructions executable by the processors, the processors operable when executing the instructions to:

identify a mode of packet loss concealment used on a destination endpoint after receiving a request to transmit a stream of frames to the destination endpoint;

generate concealment frame data locally at the apparatus using the identified mode of packet loss concealment, the generated concealment frame data simulating how first and second frames in the stream would be reconstructed at the destination endpoint if not available for playout;

compare the concealment frame data to the first and second frames to predict at the apparatus which of the first and second frames can be more accurately replicated by processing other frames in the stream besides the first and second frames using the identified mode of packet loss concealment; and transmit the first frame differently than the second frame when one of the first and second frames can be more accurately replicated than the other according to the prediction.

26. The apparatus of claim 25 wherein the processors are further operable to assign the first frame a different discardability indication than the second frame when one of the first and second frames can be more accurately replicated than the other according to the prediction.

27. A method comprising:

identifying a type of packet loss concealment used at a destination endpoint;

encoding first and second frames that are included in a stream of data that is addressed to the destination endpoint;

generating concealment frame data at the transmitting endpoint using the identified type of packet loss concealment, the generated concealment frame data simulating how the first and second encoded frames would be reconstructed at the destination endpoint if not available for playout;

comparing the concealment frame data to the first and second encoded frames to predict at the transmitting source which of the first and second encoded frames can be more accurately replicated by processing other frames in the stream besides the first and second frames using the identified type of packet loss concealment; and transmitting the first encoded frame advantageously with respect to the second encoded frame when the second encoded frame can be more accurately replicated than the first encoded frame according to the prediction.

28. The method of claim 27, further comprising:

transmitting an information signal to the destination endpoint to indicate that some frames in the stream of data are packetized and transmitted differently than others.

29. The method of claim 28, in which the information signal is transmitted during call setup.

30. The method of claim 27 further comprising:

receiving in a jitter buffer a stream of packets;

determining that at least one packet in the stream is packetized differently from at least one other packet in the stream; and setting a playout delay of the jitter buffer responsive to the determination.

31. The method of claim 27, further comprising:

classifying the first encoded frame in one of a plurality of categories according to a result of the comparison, and in which transmitting the first encoded frame is performed according to a result of classifying.

32. The method of claim 27, further comprising:

decoding the first encoded frame; and using the decoded first frame to generate at least a portion of the concealment frame data.

33. The method of claim 27, further comprising:

encoding and then decoding the first frame prior to the comparison.

34. The method of claim 27, in which synthesizing is performed using a surrogate packet loss concealment module.

35. The method of claim 34, further comprising:

encoding and then decoding the first frame prior to using the surrogate packet loss concealment module.

36. The method of claim 34, further comprising:

adjusting the surrogate packet loss concealment module.

37. The method of claim 36, further comprising:

determining whether a packet is likely to be dropped based on the comparison, and in which adjusting is performed in accordance with the determination.

38. The method of claim 36 in which adjusting is performed initially in accordance with the identified type of packet loss concealment.

39. The method of claim 38, in which identifying the type of packet loss concealment used by the destination endpoint occurs during call setup.

40. The method of claim 27, in which transmitting the first encoded frame advantageously is performed by transmitting the first encoded frame redundantly.

41. The method of claim 27, in which transmitting the first encoded frame advantageously is performed by packetizing the first encoded frame with a higher assigned priority relative to a priority of the second encoded frame.

42. The method of claim 27, in which transmitting the first encoded frame advantageously is performed by packetizing the first encoded frame with a lower assigned discardability than a discardability of the second encoded frame.

43. The method of claim 27, in which transmitting the first encoded frame advantageously is performed by packetizing the first encoded frame with added redundancy bits compared to the second encoded frame.

* * * * *